United States Patent [19]

Hyatt

[11] 4,427,143
[45] Jan. 24, 1984

[54] APPARATUS FOR AND METHOD OF INITIATING A DAMAGE-FREE SCORE

[75] Inventor: Charles J. Hyatt, Cheswick, Pa.

[73] Assignee: PPG Industries, Inc., Pittsburgh, Pa.

[21] Appl. No.: 308,001

[22] Filed: Oct. 2, 1981

[51] Int. Cl.³ .......................... C03B 33/02; B26D 3/08
[52] U.S. Cl. ........................................ 225/2; 83/880; 83/886; 225/96
[58] Field of Search ................. 83/880, 886, 887, 884; 225/96.5, 2, 96

[56] References Cited

U.S. PATENT DOCUMENTS

| | | | |
|---|---|---|---|
| 3,232,504 | 2/1966 | Ritter, Jr. et al. | 225/96.5 X |
| 3,244,337 | 4/1966 | Curtze et al. | 225/2 |
| 3,244,338 | 4/1966 | Ritter, Jr. et al. | 225/96.5 |
| 3,865,293 | 2/1975 | Ernsberger et al. | 225/2 |
| 3,865,673 | 2/1975 | DeTorre | 161/1 |
| 3,979,243 | 9/1976 | DeTorre | 156/109 |
| 4,027,562 | 6/1977 | Bonaddio | 83/8 |
| 4,057,184 | 11/1977 | Michalik | 225/2 |
| 4,096,773 | 6/1978 | DeTorre | 83/8 |
| 4,102,227 | 7/1978 | Simko | 83/7 |
| 4,137,803 | 2/1979 | Goldinger | 83/881 |
| 4,213,550 | 7/1980 | Bonaddio | 225/2 |

*Primary Examiner*—Frank T. Yost
*Attorney, Agent, or Firm*—William D. West; Donald C. Lepiane; Lee Patch

[57] ABSTRACT

Damage-free scores are initiated by engaging a scoring wheel to the surface of a refractory piece with the plane of rotation of the scoring wheel forming an oblique angle to the desired path of damage-free scoring. An aligning force generated by the interaction of the scoring wheel and the refractory piece during relative movement along the desired scoring path pivots the scoring wheel into alignment with the desired path of scoring, which pivoting creates a zone of surface damage which serves to initiate a damage-free score. Facilities are provided to urge the scoring wheel out of alignment with the desired path of scoring, with a magnitude of force less than the aligning force, such that the scoring wheel automatically returns to a pivotally offset initiating position when it is disengaged from the surface of the refractory piece.

9 Claims, 6 Drawing Figures

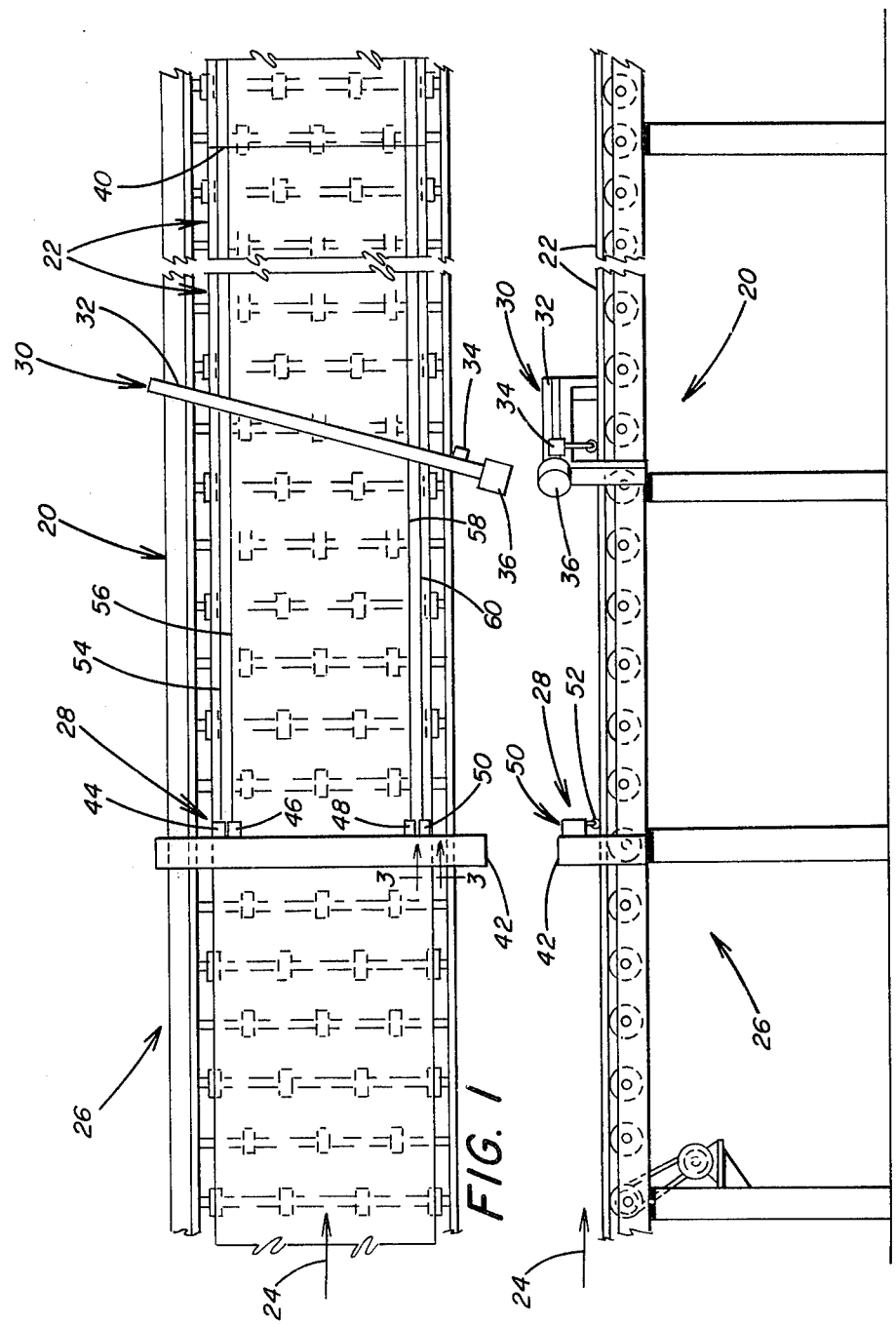

4,427,143

APPARATUS FOR AND METHOD OF INITIATING A DAMAGE-FREE SCORE

FIELD OF THE INVENTION

This invention relates to scoring a piece of refractory material, and more particularly, to the initiation of a damage-free score in a refractory piece.

DISCUSSION OF THE TECHNICAL PROBLEM

It is desirable to impose a damage-free score in a refractory piece to sever same because the resultant severed edge is essentially in a pristine condition, having essentially maximum edge strength. Such damage-free scores are generally known as subsurface scores and/or pseudosubsurface scores. As taught in U.S. Pat. No. 3,979,243, a damage-free score may be initiated at a zone of damage on the surface of the refractory piece to be scored. Various techniques exist in the art for initiating a damage-free score. For example, U.S. Pat. No. 3,979,243 teaches that an initial force may be applied by the scoring wheel which is 20% greater than the selected scoring force to thereby damage the surface of the refractory piece to initiate the damage-free score. Also disclosed is a technique of impacting the surface of the piece with the scoring wheel to damage the surface and initiate the damage-free score. Such techniques, while useful, may be limited either because pressure controlling facilities are necessary or because impact controlling facilitates are necessary. It will be appreciated that too great a pressure or too severe an impact might fracture the entire thickness of the refractory piece, while too slight a pressure or impact could fail to initiate the damage-free score with sufficient reliability.

U.S. Pat. No. 4,057,184 teaches that the surface of a refractory piece may be tapped with a rigid object, impacted with a scoring wheel, or have a scoring wheel rotatably urged against it to generate a zone of surface damage for the initiation of a damage-free score. Such techniques have been utilized on continuously moving glass ribbon, but may prove dissatisfactory because they may require the careful attention of personnel who are called upon to manually strike or rotate a scoring wheel which is biased to a rapidly moving substrate.

U.S. Pat. No. 4,213,550 teaches that a continually moving refractory piece may be scored by imposing surface damage thereon with a pointed stylis or conventional scoring wheel mounted in alignment with damage-free scoring facilities, whereby zones of surface damage pass downstream from the discrete surface damaging mechanism to the damage-free scoring facilities. Such a technique, when practiced with the impacting stylis, may be limited for the reasons discussed above, and in either embodiment, is limited by the need for discrete surface damaging mechanisms and for precise alignment between the surface damaging facilities and the damage-free scoring facilities.

U.S. Pat. No. 4,096,773 to DeTorre teaches a self-aligning apparatus for scoring fracturable material, including an elongated member to one end of which scoring facilities are mounted and to the other end of which biasing facilities are mounted. Joint facilities are mounted intermediate the two ends to freely pivot the elongated member in first and second reciprocating paths. DeTorre teaches that the scoring facilities, e.g., a rotatable wheel, is aligned with the desired score path by its interaction with the glass as the glass is moved relative to the scoring wheel. DeTorre additionally teaches that such a self-aligning apparatus may be used in imposing any of the types of scores or fissures known in the art. Although useful for its intended purpose of providing improved rotational freedom to a scoring wheel, the teachings of DeTorre do not address the problem of initiating a damage-free score in a glass sheet.

Thus, there exists a need for a method of and apparatus for initiating a damage-free score which avoids the limitations discussed above.

SUMMARY OF THE INVENTION

The present invention provides a method of initiating a damage-free score along a selected path in a refractory piece which includes biasing a pivotable and rotatable scoring wheel into contact with the surface of the refractory piece while the scoring wheel is oriented in an initiating position wherein the plane of rotation of the scoring wheel forms an oblique angle with the selected path of scoring. The scoring wheel and refractory piece are moved relative to one another along the selected path, such that the interaction therebetween generates an aligning force which pivots the scoring wheel from its initiating position through the oblique angle to a scoring position where the plane of rotation of the scoring wheel is aligned with the selected path of scoring. The oblique angle and the biasing force are selected such that a zone of surface damage is produced on the refractory piece by the scoring wheel as the scoring wheel pivots towards its scoring position. The zone of surface damage serves as the initiation point for the damage-free score within the refractory piece.

Preferably, the scoring wheel is continually urged toward its initiating position, e.g., with a spring, with an urging force which is less than the opposing aligning force. When the scoring wheel is maintained spaced from the refractory piece the urging force moves the scoring wheel toward the initiating position, where it is maintained against a stop member. When the scoring wheel is then biased against the refractory piece, e.g., a continually advancing ribbon of glass, the aligning force overcomes the urging force to pivot the scoring wheel into alignment with the selected scoring path, which pivoting damages the surface to automatically initiate the damage-free score. In this manner, a damage-free score may be simply and safely initiated without requiring discrete surface-damaging facilities or impact-controlling mechanisms.

Preferably, the oblique angle formed between the initiating position and the selected scoring path is between about 10° and about 35°, the precise value depending upon the size and shape of the scoring wheel, the thickness of the glass, the speed of the glass, and the pressure being utilized for scoring.

DESCRIPTION OF THE FIGURES

FIG. 1 is a plan view of facilities for scoring a ribbon of glass incorporating features of the present invention.

FIG. 2 is an elevated side view of the scoring facilities of FIG. 1.

DESCRIPTION OF THE INVENTION

Figure 3:
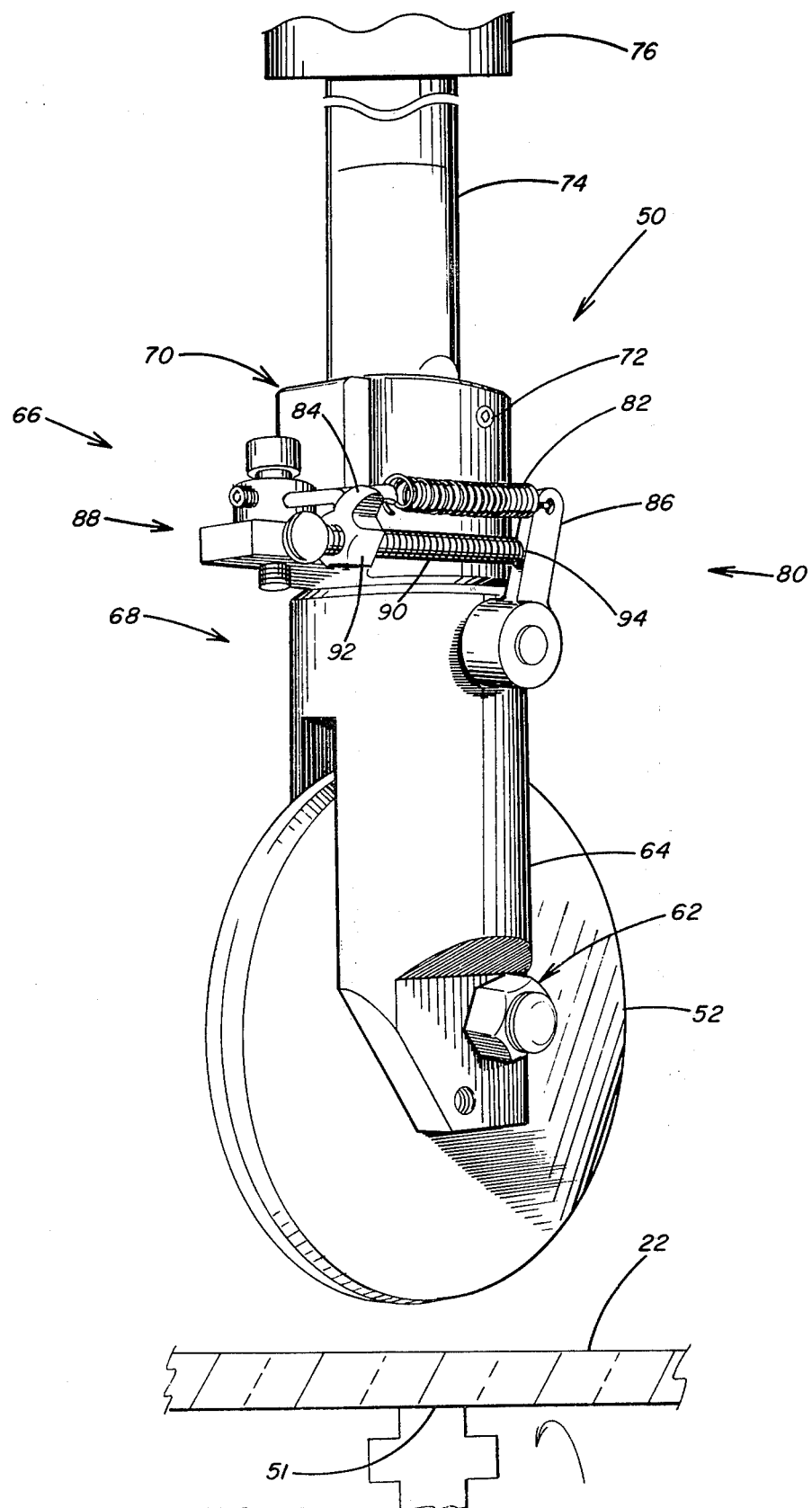
FIG. 3 is a view taken along line 3—3 of FIG. 1, having portions removed for purposes of clarity, of a scoring wheel in its initiating position, prior to being contacted to the surface of the ribbon of glass, in accordance with the teaching of the present invention.

With reference to FIGS. 1 and 2, there is shown a glass ribbon conveyor system 20 of the type used in the art for advancing a glass piece, e.g., glass ribbon 22, in the direction of arrow 24 along a movement path through a ribbon scoring station 26 incorporating features of the present invention. The ribbon scoring station 26 includes a longitudinal scoring station 28 and a lateral scoring station 30.

The lateral scoring station 30 is not limiting to the present invention, and may be any of the type used in the art for imposing a conventional lateral score. The term "conventional score" as used herein is defined as a score or fracture extending from a major surface of the piece into the thickness of the piece. The term "damage-free score" is used generically herein to include subsurface scores and pseudosubsurface scores; where "subsurface score" is defined as an essentially spall or wing-free discontinuity or fissure that is within the thickness of the refractory piece and extends substantially perpendicular to the major surfaces thereof but does not extend to or connect either major surface of the place; and where "pseudosubsurface score" is defined as a discontinuity or fissure in a piece of refractory material that extends substantially perpendicular to its major surfaces, that does not appear itself to extend to connect to either major surface, but which is accompanied by a microscopic zone of damage, essentially spall or wing-free, which extends between its tip and the major surface of the piece.

Generally, the lateral scoring station 30 includes a bridge 32 mounted above and transverse to the ribbon movement path 24. A scoring assembly 34 powered by motor 36 moves along the bridge 32, preferably at an oblique angle to the ribbon movement path 24 so that score lines 40 are generally perpendicular to the movement path 24. A bridge arrangement that may be used in the practice of the invention, although not limiting thereto, is taught in U.S. Pat. No. 3,244,337, which teachings are hereby incorporated by reference. The lateral scoring station 30 may be located either upstream or downstream of the longitudinal scoring station 28.

The longitudinal scoring station 28 generally includes a bridge 42 which spans the glass ribbon 22 and supports a plurality of scoring devices 44, 46, 48 and 50 of the type generally capable of propagating a damage-free score in the ribbon 22, e.g., those taught in U.S. Pat. Nos. 3,865,293; 3,865,673; 4,027,562; 4,057,184; 4,102,227; 4,137,803; and 4,213,550; which teachings are hereby incorporated by reference. Preferably each of the scoring devices 44, 46, 48 and 50 include a scoring wheel 52 (shown in FIG. 2) of the type having an arcuate scoring surface which is sized and loaded during operation according to the teachings of U.S. Pat. No. 4,057,184. The scoring devices 44, 46, 48 and 50 are actuated in a manner to be discussed more fully below to generate longitudinal scores 54, 56, 58 and 60, respectively, in the glass ribbon 22.

Figure 4:
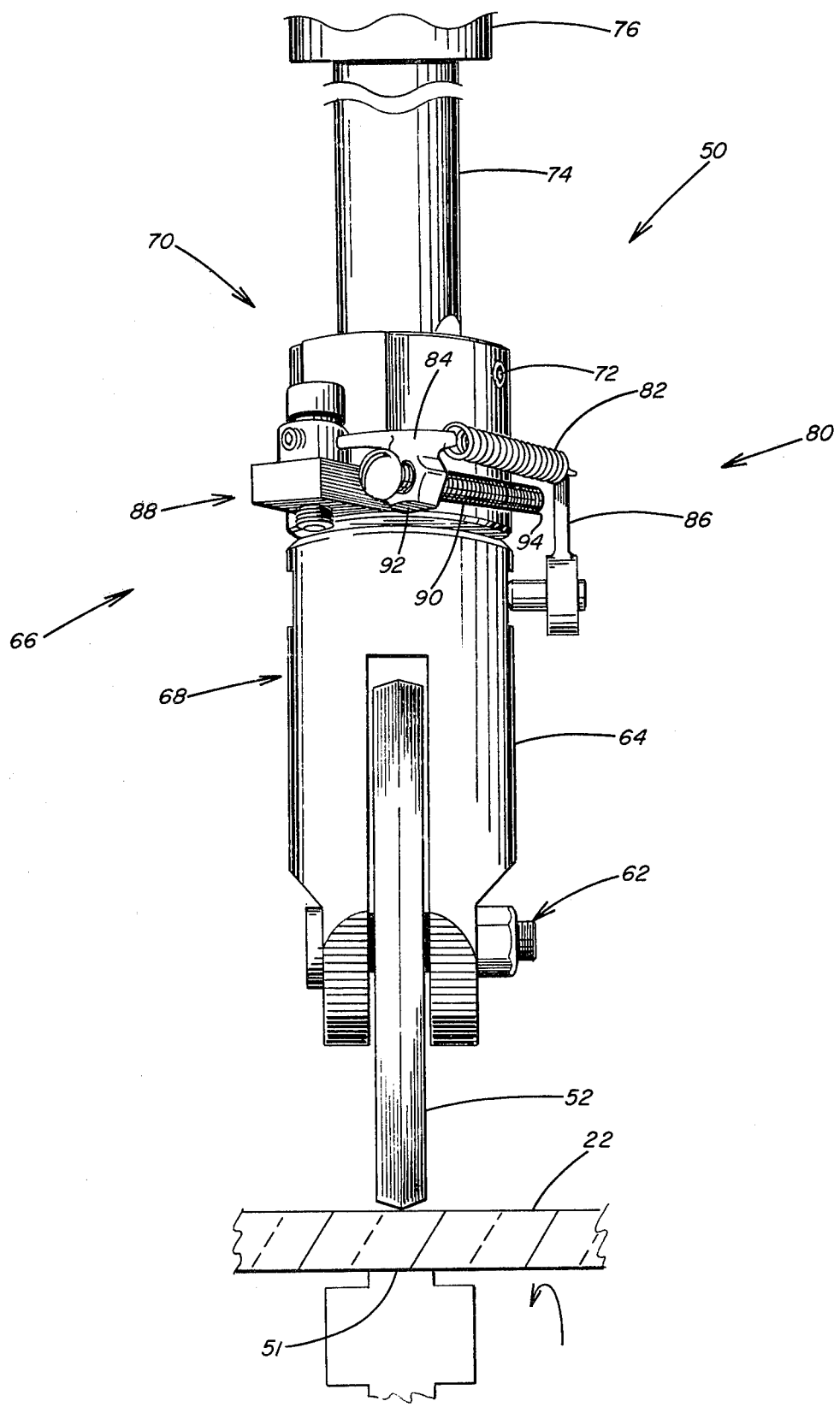
FIG. 4 is a view similar to the view in FIG. 3, showing a scoring wheel in its scoring position after being biased into contact with the surface of the ribbon of glass, in accordance with the teaching of the present invention.

With reference to FIGS. 3 and 4, there is shown the scoring device 50, which will be discussed in detail and is intended to be exemplary of each of the scoring devices 44, 46, 48, and 50, mounted above the surface of the ribbon 22 directly above a support land 51. The views in FIGS. 3 and 4 are each taken looking in a downstream direction along the ribbon 22, FIG. 3 showing the scoring device 50 in its initiating position and FIG. 4 showing the scoring device 50 in its scoring position relative to the expected path of scoring, in accordance with the teachings of the present invention.

Although not limiting to the invention, the scoring device 50 generally includes a scoring wheel 52 which is rotatably mounted by an axle assembly 62 to the bifurcated end 64 of a wheel holder assembly 66. The wheel holder assembly 66 includes a lower wheel-supporting member 68 which is pivotally mounted to an upper member 70. The upper member 70 is mounted, e.g., by set screw 72, to the lower end of the air cylinder shaft 74. Preferably the axle assembly 62 is offset a preselected distance in the downstream direction relative to the centerline of the air cylinder shaft 74, to facilitate the pivoting of the scoring wheel 52 into alignment with the direction of ribbon movement when the scoring wheel 52 is biased to the surface of the ribbon 22. The air cylinder shaft 74 is biased up and down by an air cylinder 76 to move the scoring wheel 52 into and out of engagement with the surface of the glass ribbon 22.

In accordance with the present invention the wheel holder assembly 66 further includes pivotal urging facilities 80 which serve to pivot the lower wheel-supporting member 68 and the upper member 70 relative to one another in a direction normal to the plane in which the scoring wheel 52 is rotatable. The pivotal urging facilities 80 may include a spring 82 connected at one end to a flange 84 which extends from the upper member 70 and connected at the other end to an arm 86 which extends from the lower wheel supporting member 68. Also includible in the facilities 80 is an adjustable stop member 88, which may take the form of a screw 90 movable mounted in nut 92 such that the end 94 thereof abuts on the arm 86 to limit the extent of pivotal movement produced by the spring 82.

Figures 5, 6:
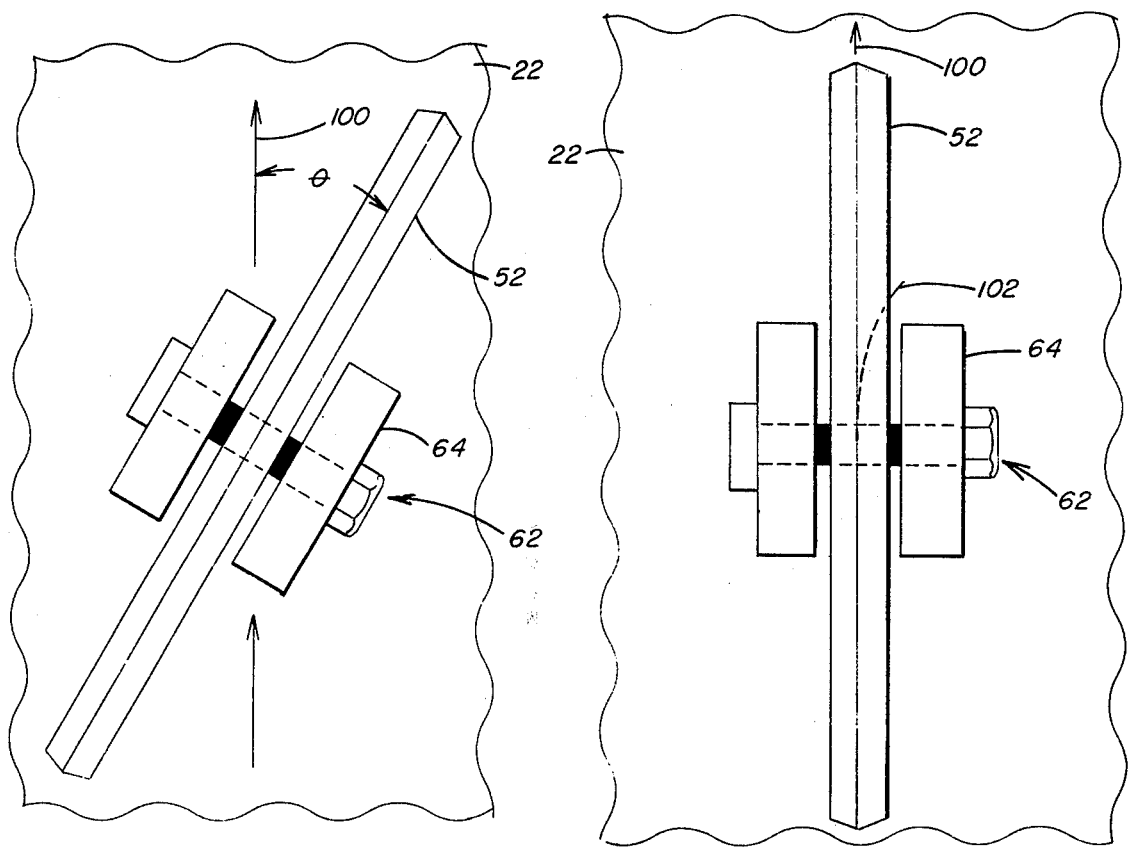
FIG. 5 is a schematic plan view showing a scoring wheel in its initiating position relative to a selected path of damage-free scoring according to the present invention.
FIG. 6 is a schematic view similar to FIG. 5 showing a scoring wheel in its scoring position relative to a selected path of damage-free scoring according to the present invention.

With reference to FIGS. 3 and 5, there is shown the preferred orientation of the scoring wheel 52 relative to the ribbon 22 prior to the initiation of a damage-free score in the ribbon 22. The air cylinder 76 is actuated to raise the scoring wheel 52 out of contact with the surface of the ribbon 22, and the action of the spring 82 pivots the lower wheel-supporting member 68 and the scoring wheel 52 relative to the upper member 70 until contact is made between the screw 90 and the arm 86. In this position, as best shown in FIG. 5, the plane through which the scoring wheel is rotatable forms an oblique angle $\theta$ with the desired path of scoring 100. The oblique angle $\theta$ is generally preset by adjustment of the position of the screw 90 to between about 10° and about 45°, and more preferably to between about 20° and about 35°. Most preferred values of the oblique angle $\theta$ depend upon the size and shape of the scoring wheel 52, the rate of advancement of the ribbon 22, the thickness of the ribbon 22, and the biasing force utilized during scoring.

When it is desired to initiate a damage-free score in the ribbon 22, the air cylinder 76 is actuated to lower the scoring wheel 52 into contact with the surface of the ribbon 22 and to bias it thereto with a predetermined biasing load sufficient for damage-free scoring. When the scoring wheel 52 contacts the ribbon 22 at the oblique angle θ to the direction of ribbon advancement, there are generated aligning forces which automatically pivot the scoring wheel 52 through the oblique angle θ to align the plane through which the scoring wheel 52 rotates with the direction of ribbon advancement, i.e., the desired path of damage-free scoring. According to the practice of the present invention, and as best seen in FIG. 4, the pivotal urging force which is supplied by the spring 82, e.g., about 3-4 ounces (84-112 grams) is selected to be less than the aligning force which is generated by the interaction of the scoring wheel 52 and the ribbon 22, such that the aligning force prevails over the action of the spring 82 to pivot the lower wheel-supporting member 68 relative to the upper member 70, thereby stretching the spring 82 and displacing the end 94 of the screw 90 from engagement with the arm 86.

As previously mentioned, to initiate a damage-free score in a refractory piece, an appropriately sized and loaded scoring wheel 52 needs to interact with a zone of surface damage on the refractory piece. According to the present invention, and as shown in FIG. 6, a zone of surface damage 102 is imposed on the ribbon 22 by the scoring wheel 52 as it pivots through the oblique angle θ from its initiating position toward its scoring position. Thus, a damage-free score is initiated within the ribbon 22 at the point where the scoring wheel reaches its scoring position due to the zone of surface damage 102 which is imposed as the scoring wheel 52 automatically pivots toward its scoring position. Additionally, upon reaching its scoring position, the scoring wheel 52 preferably ceases damaging the surface of the ribbon 22, thus leaving only a very small area of the ribbon 22 which is surface-damaged. As shown in FIG. 6, the actual surface-damaged area 102 may take the form of a curved line leading to and ending at the point where the damage-free score initiates within the ribbon 22, due to the offset of the axle assembly 62 relative to the air cylinder shaft 74. Preferably, when practiced on a conveyor system 20 such as shown in FIGS. 1 and 2, the scoring devices 44, 46, 48 and 50 will be mounted to generate the curved surface-damaged area 102 on the outboard or marginal edge-side of the ribbon 22 to minimize waste product.

When it is desired to stop generating a damage-free score, the air cylinder 76 may be actuated to raise the scoring wheel 52 from contact with the ribbon 22. When contact between the scoring wheel 52 and the ribbon 22 is broken, the aligning force is extinguished and the pivotal urging force provided by the spring 82 acts to pivot the scoring wheel 52 back through the oblique angle θ into its initiating position. Thus, it will be appreciated that a damage-free score may be initiated automatically without the need for discrete surface-damaging facilities or for personnel interaction with the scoring equipment.

EXAMPLE I

A ⅜ inch (0.95 cm.), 90° wheel angle, 0.0035 inch (0.09 mm.) tip radius scoring wheel 52 was mounted in a manner similar to that shown in FIG. 3 to an air cylinder 76 above the surface of a ribbon of ¼ inch (0.64 cm.) thick glass moving at a rate of about 100 inches per minute (254 cm. per min.). A spring 82 acted to hold the scoring wheel 52 in its initiating position (as shown in FIGS. 3 and 5) where the plane of rotation of the scoring wheel 52 formed an oblique angle θ of about 20° with the direction of ribbon advancement. The air cylinder 76 was actuated to bias the scoring wheel 52 toward the ribbon 22 with a scoring load of about 14.2 pounds (6.4 kilograms). As the scoring wheel 52 engaged the surface of the ribbon 22 an aligning force pivoted the scoring wheel 52 through the oblique angle θ into alignment with the direction of ribbon advancement. During the pivoting of the scoring wheel 52 a curved line of damage was generated on the surface of the ribbon 22 and a damage-free score was initiated in the ribbon 22 at a point near where the scoring wheel 52 became aligned with the direction of ribbon advancement.

EXAMPLE II

Example II includes a series of scoring trials which were conducted to determine a set of operating parameters which would be satisfactory in a scoring operation requiring a high degree of initiation reliability. A 4 inch (10 cm.) diameter, 70° wheel angle, 0.014 inch (0.36 mm.) tip radius scoring wheel was mounted in the manner shown in FIG. 3 as discussed above over an advancable ½ inch (1.27 cm.) thick ribbon of glass having a ¼ inch (0.64 cm.) wide support land 51 supporting its lower surface directly below the position of the scoring wheel 52. The screw 90 was adjusted such that the spring 82 held the scoring wheel 52 at an oblique angle θ of 30° to the direction of ribbon advancement. The ribbon 22 was advanced at a rate of about 74 inches per minute (188 cm. per minute) and the scoring wheel 52 was biased thereto with a load of about 412 pounds (185 kilograms). As the scoring wheel 52 engaged the surface of the ribbon 22 an aligning force pivoted the scoring wheel 52 into alignment with the direction of ribbon advancement; however, no surface damage was generated on the ribbon 22 and consequently no damage free score was initiated therein.

A second trial was performed differing from the one described in Trial 1 only in that the ribbon advancement rate was increased to about 108 inches per minute (274 cm. per minute). Again, upon engagement the scoring wheel 52 pivoted into alignment with the direction of ribbon advancement but no surface damage was generated on the ribbon and no damage free score was initiated. Thus, the operating parameters utilized in Trials 1 and 2 were not deemed acceptable for a commercial scoring operation.

A third trial was performed differing from the one described in Trial 1 only in that the screw 90 was adjusted to provide an oblique angle θ of about 35°. The scoring wheel 52 engaged the surface of the ribbon 22, pivoted through the oblique angle θ into alignment with the direction of ribbon advancement, and a curved line of surface damage was generated which successfully and automatically served as the initiation point for a damage free score within the ribbon 22. Trial 3 was identically repeated in Trials 4 and 5 with similar successful results.

A sixth trial was performed in the manner of Trial 3, differing only in that the rate of ribbon advancement was increased to about 96 inches per minute (244 cm. per minute). A curved line of surface damage was generated as the scoring wheel pivoted from its initiating position toward its scoring position, and a damage free score was automatically initiated at the end of the curved line of surface damage. Trial 6 was identically repeated in Trials 7 and 8 with similar successful results.

Ninth, tenth and eleventh trials were performed in the manner of Trial 3, differing only in that the rate of ribbon advancement was increased to about 120 inches per minute (305 cm. per minute). In each trial a curved line of surface damage was generated which served to automatically initiate a damage free score in the glass ribbon.

Twelfth, thirteenth and fourteenth trials were performed in the manner of Trial 3, differing only in that the rate of ribbon advancement was increased to about 138 inches per minute (350 cm. per minute), with each trial resulting in automatically initiated damage free scores.

A fifteenth trial was performed in the manner of Trial 3 having a rate of ribbon advancement of about 168 inches per minute (42 cm. per minute), resulting in a successful automatic initiation of a damage free score. A summary of the fifteen trials of Example II is presented in the form of Table I.

TABLE I (All trials performed with a 4 inch diameter, 70° wheel angle, 0.014 inch tip radius scoring wheel biased toward a ½ inch thick glass ribbon with a scoring wheel load of 412 pounds.)

| Trial Number | $\theta$ | Ribbon Advancement Rate (inch per minute) | Results |
| --- | --- | --- | --- |
| 1 | 30° | 74 | No surface damage, no damage-free score. |
| 2 | 30° | 108 | No surface damage, no damage-free score. |
| 3 | 35° | 74 | Curved line of surface damage, Automatic damage-free score. |
| 4 | 35° | 74 | Curved line of surface damage, Automatic damage-free score. |
| 5 | 35° | 74 | Curved line of surface damage, Automatic damage-free score. |
| 6 | 35° | 96 | Curved line of surface damage, Automatic damage-free score. |
| 7 | 35° | 96 | Curve line of surface damage, Automatic damage-free score. |
| 8 | 35° | 96 | Curved line of surface damage, Automatic damage-free score. |
| 9 | 35° | 120 | Curved line of surface damage, Automatic damage-free score. |
| 10 | 35° | 120 | Curved line of surface damage, Automatic damage-free score. |
| 11 | 35° | 120 | Curved line of surface damage, Automatic damage-free score. |
| 12 | 35° | 138 | Curved line of surface damage, Automatic damage-free score. |
| 13 | 35° | 138 | Curved line of surface damage, Automatic damage-free score. |
| 14 | 35° | 138 | Curved line of surface damage, Automatic damage-free score. |
| 15 | 35° | 168 | Curved line of surface damage, Automatic damage-free score. |

As can be appreciated from Table I, the selection of a 35° oblique angle $\theta$ apparently provides a commercially acceptable degree of damage free score initiation reliability with the particular scoring wheel and glass ribbon employed, for a wide range of different ribbon advancement rates. Of course it will be appreciated that the present invention is not limited to the specific illustrative embodiments described in the Examples, for it is expected that the invention may be practiced with a wide range of different scoring wheels, biasing loads, glass thicknesses, and ribbon advancement rates. Moreover, it has been determined that the scoring wheel may be biased against the surface of a stationary glass ribbon while the scoring wheel is in its initiating position, after-which movement by either the scoring wheel or the glass ribbon in the direction of desired scoring path will provide the necessary aligning force which pivots the scoring wheel to its scoring position and generates a surface damaged zone sufficient to initiate a damage free score. Thus, the scope of the invention is intended to be limited only by the claims which follow.

I claim:

1. A method of initiating a damage-free score in a refractory piece along a selected path, comprising the steps of:

biasing a pivotable and rotatable scoring wheel into contact with the surface of said refractory piece with a biasing force, said scoring wheel oriented in an initiating position such that the plane in which said scoring wheel is rotatable forms an oblique angle with said selected path of scoring; and moving said scoring wheel and said refractory piece relative to one another along said selected path, such that the interaction between said scoring wheel and said refractory piece generates an aligning force to pivot said scoring wheel from said initiating position through said oblique angle toward a scoring position where said plane of rotation is aligned with said selected path, said oblique angle and said biasing force having selected values sufficient to produce a zone of surface damage on said refractory piece as said scoring wheel pivots from said initiating position toward said scoring position, to initiate a damage-free score in said refractory piece.

2. The method as set forth in claim 1 wherein said oblique angle is greater than about 10°.

3. The method as set forth in claim 1 or 2 wherein said oblique angle is less than about 45°.

4. The method as set forth in claim 1 further comprising the step of:

continually urging said scoring wheel with an urging force toward said initiating position, wherein said urging force is less in magnitude than said aligning force.

5. The method as set forth in claim 4, further comprising the steps of:
   terminating the practice of said biasing step, whereby said aligning force is extinguished and said urging force pivots said scoring wheel toward said initiating position; and
   stopping the pivoting of said scoring wheel at said initiating position.

6. The method as set forth in claim 1 or 5 wherein said refractory piece is an advancing ribbon of glass.

7. The method as set forth in claim 6 wherein said wheel is a 4 inch (10 cm.) diameter, 70° wheel angle, 0.014 inch (0.36 mm.) tip radius scoring wheel, wherein said ribbon of glass is about one-half inch (1.27 cm.) thick, wherein said biasing force is about 412 pounds (185 kilograms), and wherein said oblique angle is about 35°.

8. The method as set forth in claim 6 wherein said wheel is a ⅜ inch (0.95 cm.) diameter, 90° wheel angle, 0.0035 inch (0.09 mm.) tip radius scoring wheel, wherein said ribbon of glass is about ¼ inch (0.64 cm.) thick, wherein said biasing force is about 14.2 pounds (6.4 kilograms), and wherein said oblique angle is about 20°.

9. Apparatus for initiating a damage-free score in a refractory piece, comprising:
   means for mounting a scoring wheel for rotation in a plane of rotation;
   support means pivotally secured to said mounting means;
   means for pivotally urging said mounting means and said support means relative to one another in a selected direction substantially normal to said plane of rotation;
   stop means for limiting the relative pivotal motion of said mouting means and said support means at a preselected orientation;
   a storing wheel capable of imposing a damage-free score rotatably mounted in said mounting means;
   biasing means for biasing said scoring wheel toward the surface of said refractory piece;
   means for advancing said ribbon of glass in the direction in which said damage-free score is to be imposed; and
   means for positioning said scoring wheel spaced over said ribbon of glass in said preselected orientation such that the plane of rotation of said scoring wheel forms an obtuse angle with said direction of ribbon advancement, whereby when said biasing means biases said scoring wheel into engagement with the surface of said ribbon of glass, an aligning force is generated to pivot said scoring wheel through said obtuse angle into alignment with said direction of ribbon advancement to damage the surface of said ribbon and initiate said damage-free score.

* * * * *

UNITED STATES PATENT AND TRADEMARK OFFICE
CERTIFICATE OF CORRECTION

PATENT NO. : 4,427,143
DATED : January 24, 1984
INVENTOR(S) : Charles J. Hyatt

It is certified that error appears in the above-identified patent and that said Letters Patent is hereby corrected as shown below:

Column 10, line 12, "storing" should be --scoring--.

Signed and Sealed this

Seventh Day of August 1984

[SEAL]

Attest:

GERALD J. MOSSINGHOFF

Attesting Officer

Commissioner of Patents and Trademarks